US009558236B1

(12) United States Patent
Hagen et al.

(10) Patent No.: US 9,558,236 B1
(45) Date of Patent: Jan. 31, 2017

(54) MASTER KEY IDENTIFICATION AND FEEDBACK SYSTEM

(75) Inventors: George Lynn Hagen, Las Vegas, NV (US); Mike Mueller, Phoenix, AZ (US); Mark Yeary, Gilbert, AZ (US); Kenneth C. Booth, Mesa, AZ (US)

(73) Assignee: The Hillman Group, Inc., Cincinnati, OH (US)

( * ) Notice: Subject to any disclaimer, the term of this patent is extended or adjusted under 35 U.S.C. 154(b) by 1230 days.

(21) Appl. No.: 13/440,932

(22) Filed: Apr. 5, 2012

Related U.S. Application Data

(63) Continuation-in-part of application No. 13/291,934, filed on Nov. 8, 2011, now Pat. No. 8,992,145, which is a continuation-in-part of application No. 13/183,982, filed on Jul. 15, 2011, now Pat. No. 9,073,133, application No. 13/440,932, which is a continuation-in-part of application No. 13/292,023, filed on Nov. 8, 2011, now Pat. No. 9,149,877, which is a continuation-in-part of application No. 13/183,982, filed on Jul. 15, 2011, now Pat. No. 9,073,133.

(60) Provisional application No. 61/411,401, filed on Nov. 8, 2010, provisional application No. 61/432,089, filed on Jan. 12, 2011, provisional application No. 61/413,099, filed on Nov. 12, 2010, provisional application No. 61/497,468, filed on Jun. 15, 2011, provisional application No. 61/411,148, filed on Nov.

(Continued)

(51) Int. Cl.
*G06F 17/30* (2006.01)

(52) U.S. Cl.
CPC ..... *G06F 17/30424* (2013.01); *B23C 2235/12* (2013.01); *B23C 2235/28* (2013.01); *Y10T 409/301624* (2015.01)

(58) Field of Classification Search
CPC .............. G06F 17/301; G06F 17/30106; G06F 17/30973; G06F 17/30985; G06F 17/30424; Y10T 409/301624; B23C 2235/28; B23C 2235/12
USPC ........................ 707/758; 382/100; 409/80, 81
See application file for complete search history.

(56) References Cited

U.S. PATENT DOCUMENTS

| | | |
|---|---|---|
| 2,148,667 A | 2/1939 | Yoskowitz et al. |
| 3,116,665 A | 1/1964 | Reisner |

(Continued)

FOREIGN PATENT DOCUMENTS

WO   WO2008/066857 A2   6/2008

*Primary Examiner* — Thanh-Ha Dang
(74) *Attorney, Agent, or Firm* — Finnegan, Henderson, Farabow, Garrett & Dunner, LLP

(57) ABSTRACT

A key model identification and feedback system includes a key identification housing, a master key receiving aperture, a master key identifier, a processor in communication with the master key identifier, and a feedback module. The processor is configured to access a database defining a plurality of known key models, compare the physical characteristics of the master key with physical characteristics of the known key models in the database to identify a model of the master key, and communicate the model of the master key to the feedback module coupled to the key identification housing. The feedback module, responsive to the communication from the processor, outputs an indication of the model of the master key and directions to a location remote from the key identification housing where a key blank having the same model of the master key is available for duplicating the master key.

45 Claims, 10 Drawing Sheets

Related U.S. Application Data 8, 2010, provisional application No. 61/364,644, filed on Jul. 15, 2010, provisional application No. 61/472,123, filed on Apr. 5, 2011.

(56) References Cited

U.S. PATENT DOCUMENTS

| | | | |
|---|---|---|---|
| 3,323,420 A | 6/1967 | Roxburgh | |
| 3,358,561 A | 12/1967 | Roxburgh et al. | |
| 3,413,892 A | 12/1968 | Casey et al. | |
| 3,442,174 A | 5/1969 | Weiner et al. | |
| 3,602,092 A | 8/1971 | Richens | |
| 3,682,041 A | 8/1972 | Essig | |
| 3,796,130 A | 3/1974 | Gartner | |
| 3,865,011 A | 2/1975 | Patriquin | |
| 3,978,764 A | 9/1976 | Patriquin | |
| 4,159,783 A | 7/1979 | Crasnianski | |
| 4,666,351 A | 5/1987 | Marchal | |
| 4,741,652 A | 5/1988 | Marchal | |
| 4,752,876 A | 6/1988 | Couch et al. | |
| 5,172,829 A | 12/1992 | Dellicker, Jr. | |
| 5,807,042 A | 9/1998 | Almblad et al. | |
| 6,839,451 B2 * | 1/2005 | Campbell | B23C 3/35 382/100 |
| 7,890,878 B2 * | 2/2011 | Bass | G06F 17/30398 715/764 |
| 7,891,919 B2 * | 2/2011 | Bass | B23C 3/35 409/81 |
| 8,626,331 B2 * | 1/2014 | Marsh | G05B 15/02 700/106 |
| 2002/0191849 A1 * | 12/2002 | Campbell | B23C 3/35 382/181 |
| 2007/0003388 A1 * | 1/2007 | Doong | B23C 3/35 409/82 |
| 2008/0145163 A1 * | 6/2008 | Freeman | B23C 3/35 409/83 |
| 2009/0180664 A1 * | 7/2009 | Efstathiades | G06K 9/00 382/100 |
| 2010/0278437 A1 * | 11/2010 | Thompson | G06K 9/00208 382/209 |
| 2011/0262240 A1 * | 10/2011 | Mutch | B23C 3/35 409/82 |
| 2011/0301738 A1 * | 12/2011 | Freeman | B23C 3/35 700/106 |
| 2012/0243957 A1 * | 9/2012 | Drake | B23C 3/35 409/81 |
| 2013/0170693 A1 * | 7/2013 | Marsh | G05B 15/02 382/100 |

\* cited by examiner

MASTER KEY IDENTIFICATION AND FEEDBACK SYSTEM

CROSS REFERENCE TO RELATED APPLICATIONS

This application is a continuation-in-part application of U.S. patent application Ser. No. 13/291,934 to Mueller et al., entitled "Multi-Key Duplication, Identification and Cutting Machine with Clamp," which was filed on Nov. 8, 2011, which is a continuation-in-part application of U.S. patent application Ser. No. 13/183,982 to Mueller et al. entitled "Key Blank and Carrier Adapted for Positioning a Key Blank in a Cutter During Bit Cutting," which was filed on Jul. 15, 2011, and claims the benefit of the filing dates of U.S. Provisional Patent Applications: 61/411,401 to Mueller et al. entitled "Two-Key Duplication ID and Cutting Machine with Specialized Clamp" which was filed on Nov. 8, 2010, and 61/432,089 to Hagen et al. entitled "Key Duplication Identification Systems and Cutting Machines and Related Methods," which was filed Jan. 12, 2011, the disclosures of all of which are hereby incorporated herein in their entirety by this reference.

This application is also a continuation-in-part application of U.S. patent application Ser. No. 13/292,023 to Mueller et al., entitled "Interaction between a Key Duplication Housing and a Key Blank Carrier," which was filed on Nov. 8, 2011, which is a continuation-in-part application of U.S. patent application Ser. No. 13/183,982 to Mueller et al. entitled "Key Blank and Carrier Adapted for Positioning a Key Blank in a Cutter During Bit Cutting," which was filed on Jul. 15, 2011, and also claims the benefit of the filing dates of U.S. Provisional Patent Applications: 61/413,099 to Hagen et al. entitled "Key Duplication Machine Cutting System," which was filed on Nov. 12, 2010, 61/497,468 to Hagen et al. entitled "Key Packaging and Duplication Systems," which was filed on Jun. 15, 2011, 61/411,148 to Mueller et al. entitled "Key Duplication Machine Identification System" which was filled on Nov. 8, 2010, and 61/364,644 to Hagen et al. entitled "Key Duplication Packaging and Standard Reference Features," which was filed Jul. 15, 2010, the disclosures of all of which are hereby incorporated herein in their entirety by this reference.

This application also claims the benefit of the filing date of U.S. Provisional Patent Application 61/472,123 to Hagen et al. entitled "Key Duplication Key Identification Receipt System and Related Methods," which was filed on Apr. 5, 2011, the disclosure of which is hereby incorporated herein in its entirety by this reference.

BACKGROUND

1. Technical Field

Aspects of this document relate to public use key cutting and key duplication machines for reproducing keys. More specific implementations relate to simplified key duplication systems for identifying a predetermined number of keys for duplication.

2. Background Art

Conventionally, key cutting and key duplication machines are used to copy a key by cutting a bit pattern of a master key onto a key blank. It is known to use methods such as tracer bars, stylus, or other types of mechanical arms to trace a master key bit pattern. A trained operator conventionally was required to eyeball both a master key and a key blank and verify whether both keys are the same size and whether they comprise identical groves before attempting to cut the key. Once the key groves and key shape are verified, the master key and the key blank are placed in a key cutting machine such that the master key faces a stylus or a tracer bar and the key blank faces a cutting wheel.

After the keys are securely gripped by the key cutting machine, a carriage is manually shifted longitudinally along supporting shaft to trace the master key bit pattern so that the cutting wheel cuts the identical key pattern into the corresponding key blank. The key blank cut with the master key pattern is then removed from the grip and buffed on a buffing wheel to remove burrs.

An example of an elaborate system used to assist a trained worker in selecting an appropriate key blank and appropriately positioning the key blank and master key for cutting is disclosed in U.S. Pat. No. 5,443,339 to Heredia et al., titled "Method and Apparatus for Aligning and Cutting Single-sided and Double Sided Keys." More recent master key identification systems, such as that disclosed in U.S. Pat. No. 6,836,553 to Campbell et al., titled "Key Identification System," the disclosure of which is hereby incorporated herein by reference, automatically identifies the appropriate key blank and indicates that number for key selection.

A recent key duplication system described in International Application Number PCT/US2007/024522 to Freeman, et al. titled "Fully Automatic Key Duplicating Machine with Automatic Key Model Identification System" sought to reduce the need for the operation skills of a trained worker by automatically identifying master keys and automatically cutting and dispensing a duplicate key from a limited selection of keys within the key duplication system. Another recent key duplication system described in U.S. Pat. No. 7,890,878 to Bass et al., titled "Object Identification System," discloses a system that identifies an appropriate key blank by flashing a light adjacent the appropriate key blank on a product display next to a key blank cutter so that the consumer or a trained worker can select the appropriate key for insertion into the key blank cutter.

More than sixty percent of keys duplicated in United States are made either by SCHLAGE and KWIKSET manufacturers. Complex cutting machines not only aggravate issues pertinent to key cutting among consumers, such as key miscuts, they also tend to confuse a consumer with their intricacies and the skill required to operate.

SUMMARY

According to a first aspect, a master key model identification and feedback system may comprise a key identification housing, a master key receiving aperture on the housing sized to receive a master key, a master key identifier adjacent to the master key receiving aperture and configured to capture physical characteristics of the master key, and a processor, in communication with the master key identifier, the processor configured to access a database defining a plurality of known key models, compare the physical characteristics of the master key with physical characteristics of the known key models in the database to identify a model of the master key, and communicate the model of the master key to a feedback module coupled to the key identification housing, wherein the feedback module, responsive to the communication from the processor, outputs an indication of the model of the master key and directions to a location remote from the key identification housing where a key blank having the same model of the master key is available for duplicating the master key.

Particular embodiments and implementations may comprise one or more of the following. The feedback module may comprise a printer configured to print the model of the master key on a ticket. The printer may further be configured to print the directions to the remote location on the ticket. The key duplication system may be operatively associated with the key identification housing and housing a plurality of available key blanks of known key models. The key duplication system may be configured to dispense a selected available key blank matching the model of the master key when a user selects the available key blank. The processor may communicates the model of the master key to the feedback module when the model of the master key is not among the plurality of available keys. The master key identifier may comprise a scanner that captures the physical characteristics of the master key. The indication of the model of the master key may comprise one or more of: a manufacturer name, a model name, a SKU, a graphic representation of the master key, a barcode, and a unique identification number. If the processor is unable to identify the model of the master key from the physical characteristics of the master key, the feedback module may output an indication that the model of the master key is unknown and directions to the location remote from the key identification housing where additional identification assistance is available to identify the model of the master key.

According to another aspect, a method for verifying a master key model and providing feedback to a customer may comprise receiving a master key in a master key receiving aperture on a key identification housing, capturing physical characteristics of the master key with a master key identifier, accessing, with a processor, a database defining a plurality of known key models, comparing, with the processor, the physical characteristics of the master key with physical characteristics of the known key models in the database to identify a model of the master key, communicating, with the processor, the model of the master key to a feedback module coupled to the key identification housing, and responding to the communication from the processor, with the feedback module, by outputting an indication of the model of the master key and directions to a location remote from the key identification housing where a key blank having the same model as the master key is available for duplicating the master key.

Particular embodiments and implementations may comprise one or more of the following. Outputting an indication and directions may comprise printing, with the feedback module, the indication of the model of the master key on a ticket. Outputting an indication and directions may further comprise printing the directions to the remote location on the ticket. Providing a key duplication system operatively associated with the key identification housing and housing a plurality of available key blanks of known key models. Dispensing, with the key duplication system, a selected available key blank matching the model of the master key when a user selects the available key blank. Communicating, with the processor, the model of the master key to the feedback module when the model of the master key is not among the plurality of available keys. The master key identifier may comprise a scanner that captures the physical characteristics of the master key. The indication of the model of the master key may comprise one or more of: a manufacturer name, a model name, a SKU, a graphic representation of the master key, a barcode, and a unique identification number. If the processor is unable to identify the model of the master key from the physical characteristics of the master key, outputting, with the feedback module, an indication that the model of the master key is unknown and directions to the location remote from the key identification housing where additional identification assistance is available to identify the model of the master key.

According to another aspect, a master key model identification, duplication, and feedback system may comprise a key identification housing, a master key receiving aperture on the housing sized to receive a master key, a master key identifier adjacent to the master key receiving aperture and configured to capture physical characteristics of the master key, a key duplication system operatively associated with the key identification housing, housing a plurality of available key blanks of the known key models, and configured to dispense an available key blank when a user selects the available key blank, a processor, in communication with the master key identifier, the processor may be configured to access a database defining a plurality of known key models, compare the physical characteristics of the master key with physical characteristics of the known key models in the database to identify a model of the master key, determine whether the model of the master key matches a model of at least one of the plurality of available key blanks, and communicate the model of the master key to a feedback module, comprising a printer and coupled to the key identification housing, when the model of the master key does not match a model of at least one of the plurality of available key blanks, wherein the feedback module, responsive to the communication from the processor, prints on a ticket an indication of the model of the master key and directions to a location remote from the key identification housing where a key blank having the same model of the master key is available for duplicating the master key.

Particular embodiments and implementations may comprise one or more of the following. The indication of the model of the master key comprises one or more of: a manufacturer name, a model name, a SKU, a graphic representation of the master key, a barcode, and a unique identification number. The master key identifier may comprise a scanner that captures the physical characteristics of the master key. If the processor is unable to identify the model of the master key from the physical characteristics of the master key, the feedback module may print on a ticket an indication that the model of the master key is unknown and directions to the location remote from the key identification housing where additional identification assistance is available to identify the model of the master key.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. §112, ¶6. Thus, the use of the words "function," "means" or "step" in the Detailed Description or Description of the Drawings or claims is not intended to somehow indicate a desire to invoke the special provisions of 35 U.S.C. §112, ¶6, to define the invention. To the contrary, if the provisions of 35 U.S.C. §112, ¶6 are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. §112, ¶6. Moreover, even if the provisions of 35 U.S.C. §112, ¶6 are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Particular illustrative implementations will hereinafter be described in conjunction with the appended drawings, where like designations denote like elements, and.

DESCRIPTION

This disclosure, its aspects and implementations, are not limited to the specific components or assembly procedures disclosed herein. Many additional components and assembly procedures known in the art consistent with the intended key duplication systems and/or assembly procedures for key duplication systems will become apparent from this disclosure. Accordingly, for example, although particular key duplication systems and components are disclosed, such systems and implementing components may comprise any shape, size, style, type, model, version, measurement, concentration, material, quantity, and/or the like as is known in the art for such systems and implementing components, consistent with the intended operation of a key duplication system.

Figure 1:
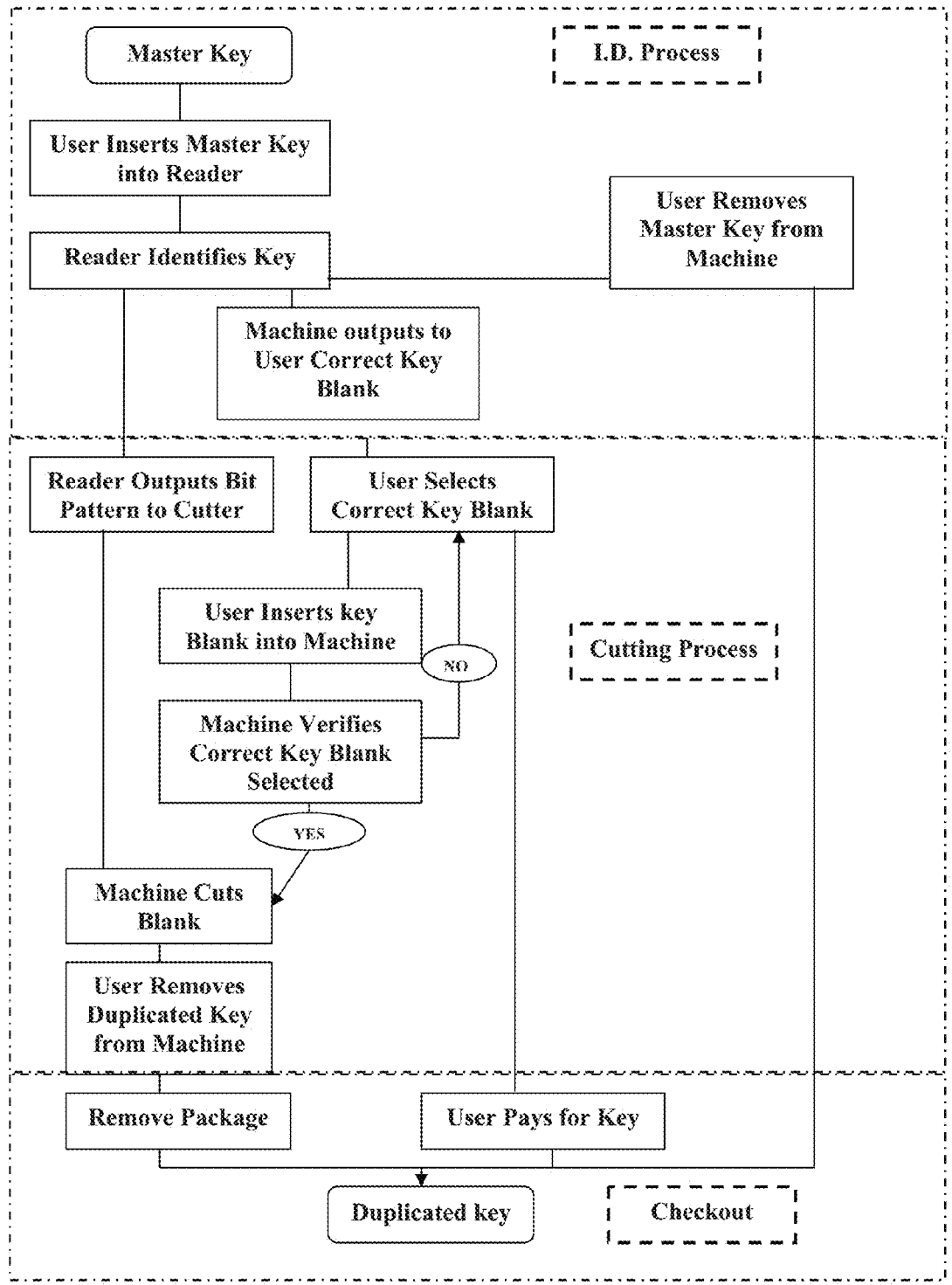
FIG. 1 is a block diagram of a specific key duplication process.

An overview for a process of enabling a consumer to cut its own duplicate key is illustrated in FIG. 1. In particular embodiments of key duplication system, a key blank receiving aperture receives a key blank solely or contained in a carrier and securely holds the key blank with a key blank clamp while at least one key blank cutter within the housing cuts the key blank to reflect the bit pattern of a master key. This disclosure is not concerned with various key blanks and it is intended to disclose methods of interaction between a key blank receiving aperture, a master key receiving aperture, a master key identification, a multi-key clamp, a key blank cutter, and a limited number of key blank models. This disclosure further reveals various groupings of a master key identifier, a key blank receiving aperture, a key blank cutter, and a key blank clamp in a key duplication system. The disclosure further sheds light on structure of a key clamp capable of interfacing with and securely holding keys made by different key manufacturers.

The specific cutting and checkout processes are also not crucial to the present disclosure and any discussion of them is provided as an example for clarity of discussion and is not intended as a limitation for use of the key receiving aperture, key clamp, key identifier or key clamp.

Figure 2:
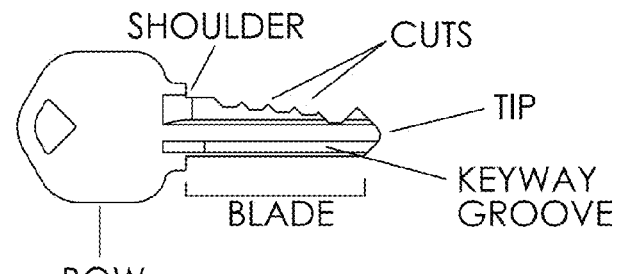
FIG. 2 is a side view of a master key.

FIG. 2 illustrates a general key of the type to be identified through the key identification system embodiment and methods described herein include several important parts as identified in the image immediately below this paragraph. Those parts include the key head or "bow", the shoulder, the blade and the tip. The key head, shoulder, blade, keyway grooves and tip, may be different for different makes and models of keys, but all have these corresponding parts. Some key blades, like those for particular automobiles for example, may have cuts on two opposing sides of the blade. On the key blade are the parts of the key that are the primary parts in identifying and duplicating the key, namely the key "cuts" or bit pattern, and the "keyway groove(s)." The bit pattern or cuts of the key blade are the code for the key that allow the key to manipulate a lock that has been keyed to that particular code. The keyway groove(s) alone may be enough to identify the particular make and model of the key blank to use for duplicating the key.

Figure 3:
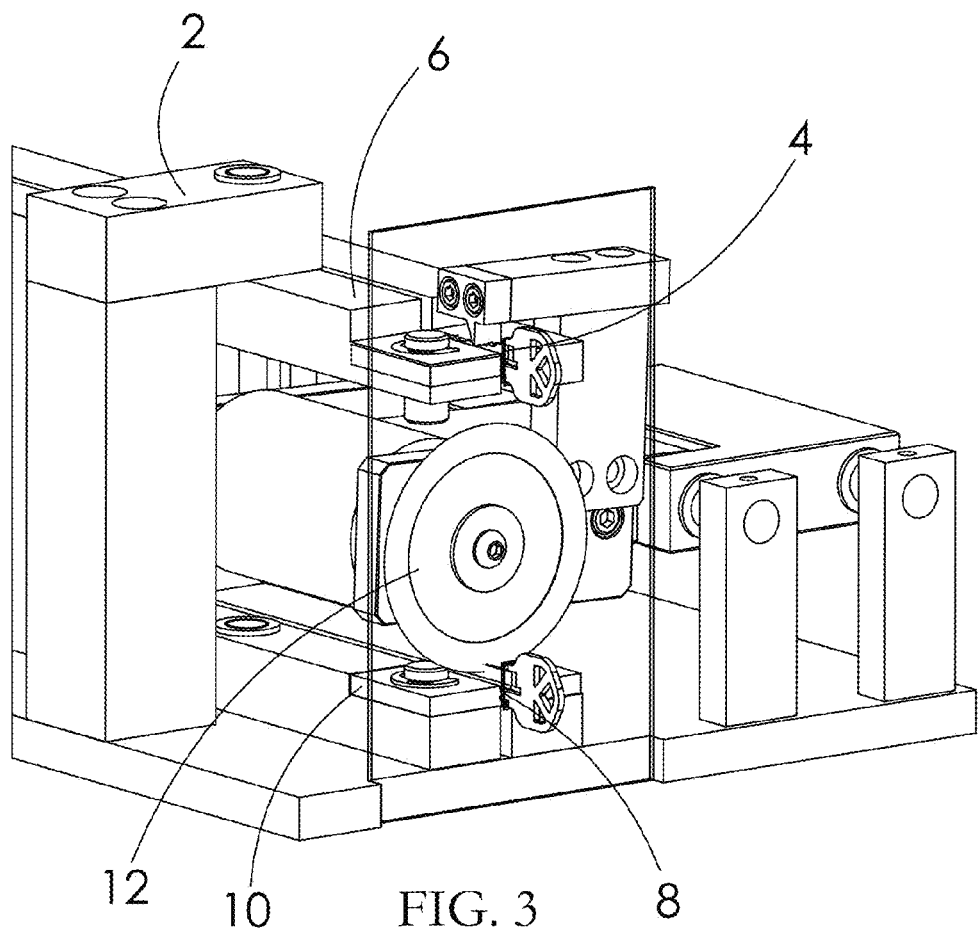
FIG. 3 is a perspective view of a first embodiment of a key cutting machine with portions of the housing removed and the front panel made see-through to show internal components of the machine.

FIG. 3 illustrates a particular implementation of key duplication housing 2 where in at least one master key receiving aperture 4 is located on one side of the housing to receive a master key blade, and a master key identification apparatus 6 is located adjacent to the at the least one master key receiving aperture to identify the key master key type and the bit pattern on the master key. By way of a non limiting example particular implementations of the key identification apparatus may further comprise simple contact sensor, such as a Hall-Effect sensor that traces the key bit pattern, or a simple non-contact sensor, such as a see-through (or thru-beam) sensor, or a combination thereof to trace a master key's bit pattern. Other implementations may include any other key identification method or structure known in the art including, but not limited to, image recognition and full or partial user identification of the master key from a display. Furthermore, at least one key blank receiving aperture 8 is located on the housing (same side for this particular implementation, though not required for all implementations), and at least one key blank clamp 10 is located adjacent to the least one key blank receiving aperture. The at least one key blank clamp 10 holds the key blank securely, by interfacing with at least one side surface of the key blank and engaging the keyway grooves of that side surface for a majority of the length of the key blade, and in some implementations substantially all of the length of the key blade, in a predetermined location in relation to the at least one key blank cutter 12 within the housing.

Figure 4A:
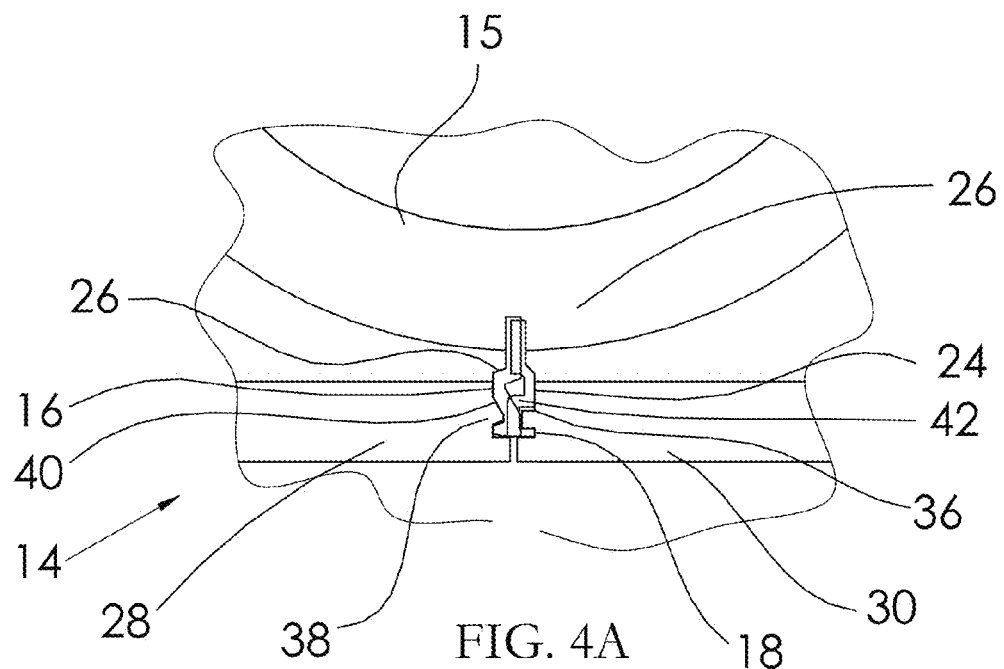
FIG. 4A is a simplified view of a key cutting system clamp illustrating how a specialized clamp mates with the keyway grooves of both types of keys.

In a particular implementation of the key duplication system, as illustrated in FIG. 4A, the at least one key clamp 14, implemented as a key blank clamp 14 in this illustration, possesses clamping surfaces 16, 18 that allow the at least one key clamp 14 to directly interface with and engage the surface 24, 26 and keyway grooves of a key blank blade 40, 42 in order to securely hold each of two specific and different key blank cross-sections in a determined position in relation to a cutting wheel 15 during the cutting process. The two key blank blades 40, 42 illustrated in FIG. 4 are both shown within the same clamp in FIG. 4 and slightly overlapping for illustrative purposes to show the distinct cross-sectional shapes of these two different key blades. Two keys would, of course, not simultaneously be placed in the clamp at the same time, but the overlapping key shapes in relation to the clamp emphasizes why it is difficult to securely clamp keys of differing cross-sectional shapes with the same clamp. This particular key clamp 14 embodiment is configured for, a Kwikset key blade 42 and a Schlage key blade 40. The at least one key clamp 14 further comprises at least two distinct clamping surface 16, 18 topographies such that the surfaces 16, 18 are configured to mate with and correspond to different key blade surfaces 24, 26. In a particular, non-limiting implementation of the key clamp, the surfaces 16, 18 of the left and right clamping arms 28, 30 may, respectively, comprise a topography shaped to mate with the respective single side surfaces of the blades of Schlage 40 and Kwikset 42 keys for additional support. Which clamp surface 16, 18 matches which corresponding key surface 24, 26 is not critical to the clamp 14, but an arrangement where the right clamp 30 and surface 22 topography engages the right key side keyway groove of a Kwikset 42 key side topography and the left clamp 28 surface 20 engages the left key side keyway groove of a Schlage 40 key side topography is most likely and provides the advantage of a more secure engagement for these two particular key types than the reverse configuration.

Particular implementations may be configured for engaging and simple, secure clamping of the blade keyway grooves for any two different key types by changing the respective left or right clamp surface to a different surface topography. For example, if a simplified, consumer operated key duplication system is needed for a small lock shop, two of the most commonly sold small lock key side topographies could be matched (one on one clamp side and the other on the other clamp side) to create an inexpensive, easy to operate key duplication system for a specialized key duplication location. As illustrated in FIG. 4A, in a particular implementation of the key clamp, key clamping surfaces 16, 18 may include mating keyway groove guides 36, 38 on the clamp surfaces that engage the key surface. Use of keyway groove guides 36, 38 that engage the keyway groove on a side of the key while cutting the key may alleviate the need for additional system components to straighten or re-align the master key in the clamp upon and after insertion because the pattern on the center support acts as a guide to ensure straightness in addition to physically restraining the key during the cutting process.

Figure 4B:
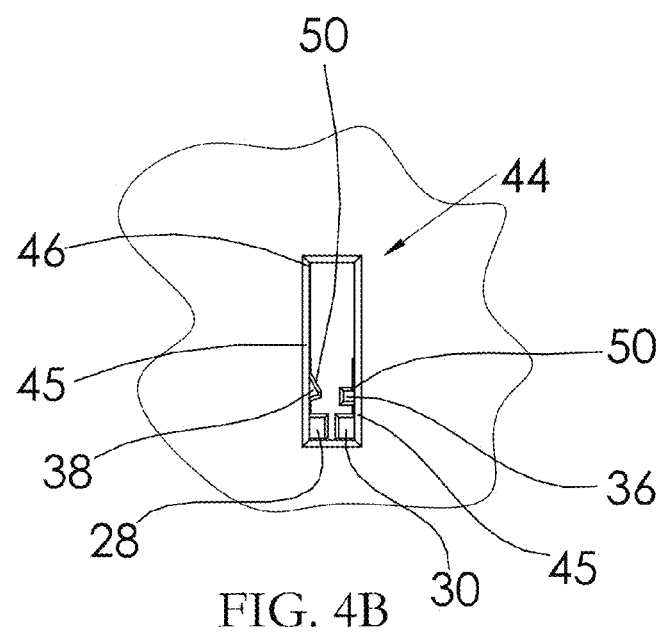
FIG. 4B is a view of a key receiving aperture of a key cutting system showing portions of the key clamp of FIG. 4A.

In particular implementations, for example as illustrated in FIG. 4B, a key receiving aperture 44 on a key duplication system, whether the key receiving aperture 44 is used for a master key in a key identifier or for a key blank in a key cutter, may comprise tapered side walls 45 about the perimeter 46 surrounding the key receiving aperture 44 to assist in guiding the key blade to the opening. The key blade clamp forward edges 48, 50 may also be tapered, for example as shown in FIG. 4B, to guide the key blade of a key inserted into the key blade aperture to be guided into mating with the keyway groove guides 36, 38 on the surfaces of the respective left 28 and right 30 clamps. In use as a key blank clamp, particular implementations of the key clamps disclosed herein may be used to confirm that the correct key blank is inserted into the clamp (in simple implementations by not mating with key blanks that do not match the opening shape), that the key is properly aligned for the cutting wheel 15 (FIG. 4A) by one of the keyway groove guides 36, 38 engaging with the correct key blank, and that the key is securely held by the clamp closing after the key is fully inserted with one of the keyway groove guides 36, 38 engaging a keyway groove on one side of the key for a majority of the length of the key blade, and in some implementations for substantially all of the length of the key blade where the key blade is cut. In use as a master key clamp, particular implementations of the key clamps disclosed herein may be used to identify the master key for the consumer to signal which key blank to choose, to confirm that the master key is properly aligned with a key bit identifier whether implemented as a mechanical or other tracing system or as an optical trace, optical image capture or other identifier, and to hold the master key still and prevent removal of the master key during the key identification and/or duplication process.

In some particular implementations, though not required, additional sensors may be included to assist in identification of a key type or verification that a particular key type is inserted. Because particular embodiments of the disclosed key duplication systems are configured to receive two different key types in the same key receiving aperture, there is a chance that a user may insert a master key of a first type and accidentally select a key blank of a second type. There are several different ways this problem may be addressed.

In a particular implementation of a key receiving aperture, by non-limiting example such as that illustrated in FIG. 4B, the key receiving aperture 44 may dynamically revise its perimeter's 46 shape after a consumer or system identifies a master key type through a digital interface coupled with a side of the duplication housing. The dynamic shape modification ensures correct key is being inserted, either as a master key receiver or as a key blank receiver, and that the insertion is taking place in an appropriate direction in relation to the key clamp. By way of a non-limiting example, the perimeter shape 46 of at least one key receiving aperture 44 may be partially defined by a surface shape of at least one key clamp element wherein one of the clamp elements with a profile corresponding to the surface topography of a particular key may be positioned in the way of key receiving aperture to allow only a key with a single matching profile to be inserted into the housing.

Figure 5:
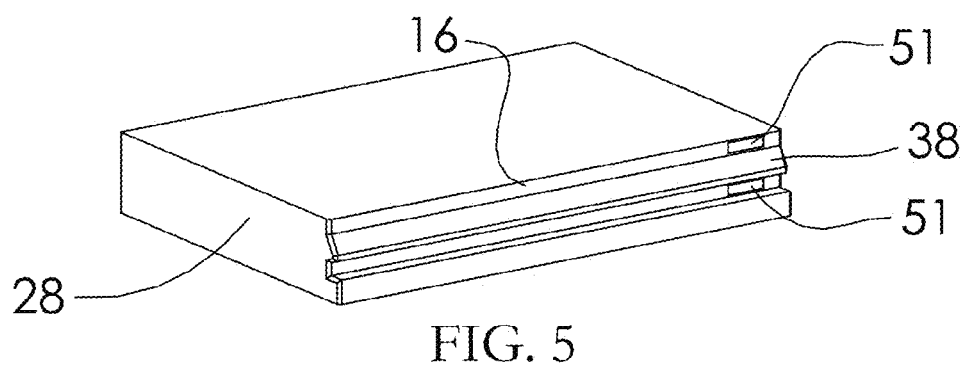
FIG. 5 is a perspective view of a key clamp surface with an optional sensor.

In particular implementations, whether used as a master key clamp or a key blank clamp, the clamp may be provided with additional key sensors located along the keyway groove guides of one or both sides of the clamp. Because the keyway groove guides of the clamp surface engage the keyway groove of the expected key type, one or more sensors placed within the keyway groove guide can be positioned to only be activated if the expected key is inserted. FIG. 5 illustrates a surface view of a left clamp 30 of the clamp of FIG. 4A, but with a non-limiting example of a pair of pressure sensors 51 placed within the keyway groove adjacent guide 38. Other sensor embodiments are also contemplated by this disclosure and are considered equivalent to a pressure sensor if they sense the presence of a key within a keyway groove guide so that the key type can be confirmed.

Figure 6:
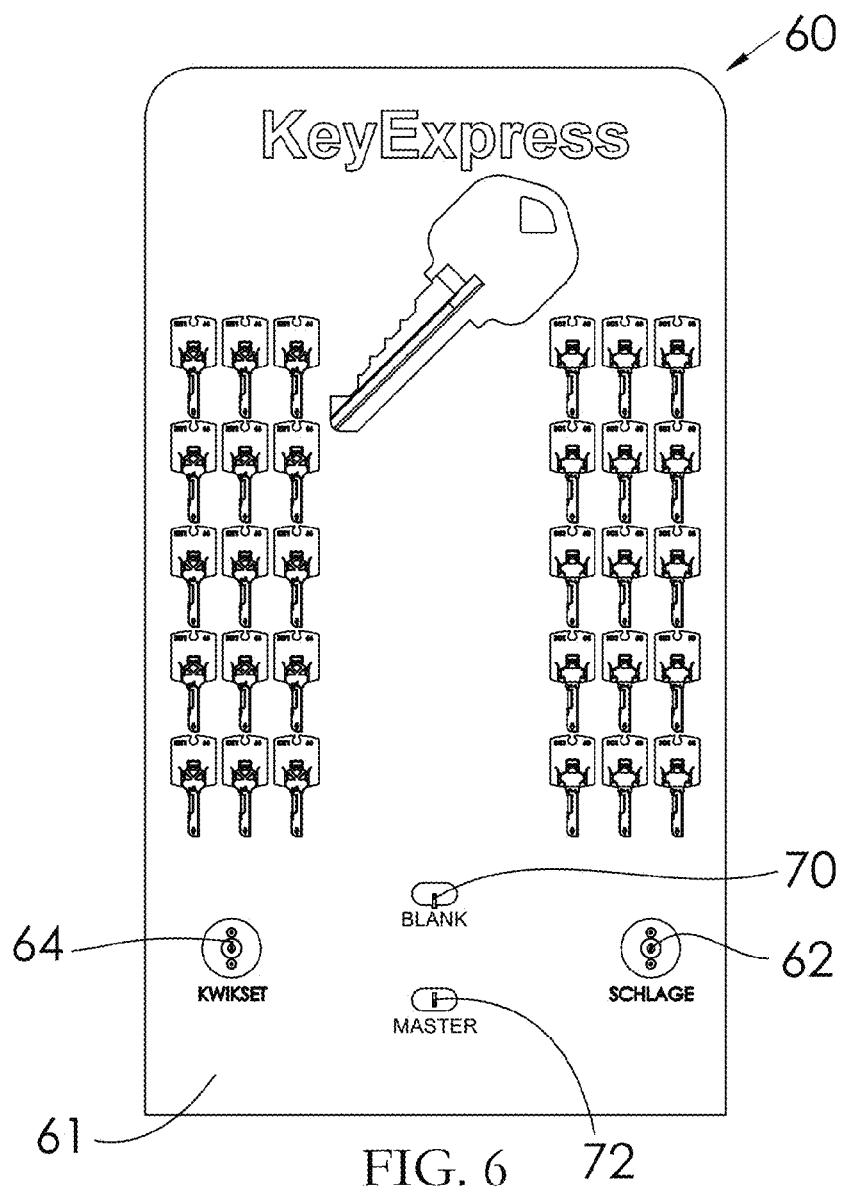
FIG. 6 is a view of a key duplication system and related key vending display for a two-key vending kiosk.

FIG. 6 illustrates a particular implementation of the key duplication system 60 associated with a key vending system wherein identification of a master key bit pattern takes place without dependency on a computerized database. In this particular implementation, at least two master key receiving apertures 62, 64 are mounted in one side 61 of the key duplication system 60, each master key receiving aperture 62, 64 corresponding to a distinct key brand, in this preferred embodiment the distinct brands are Schlage and Kwikset, which as illustrated above have very distinct key blade cross-sectional shapes.

In this particular implementation, a consumer approaches the key duplication system 60 and inserts the consumer's master key into one of the two master key receiving apertures 62, 64. If the key fits into the key receiving aperture, the key brand has been identified as being able to be duplicated at the machine. In one particular embodiment, the master key receiving apertures 62, 64 used for identification are simply the keyways of conventional locks corresponding to the two distinct brands. In particular implementations, an indicator illuminates adjacent to a set of key blanks available for choice by the consumer, or a message displays to the consumer on a display indicating from which key blanks the consumer may select a key blank for duplication. Having at least two master key receiving apertures each designated to receive a particular key brand alleviates the need for a database to store key brand information.

Once the master key is identified and the key blank is selected, the consumer places the key blank, either in a carrier or bare depending upon the configuration of the system and the key blanks, into a key blank receiving aperture 70. The key blank receiving aperture 70 is configured, using methods disclosed herein or in a related or incorporated application, to ensure the key blank being inserted into the key blank receiving aperture 70 is inserted facing the correct direction and positioned appropriately for the key cutter housed within the system 60. See, for example, the embodiment illustrated in FIG. 3. In the particular implementation illustrated in FIG. 6, a master key receiving aperture 72 is positioned below the key blank receiving aperture 70 for holding of the master key during the key blank cutting process. In other implementations, the master key may be left in the identification key receiving aperture 62 or 64 depending upon the method and hardware used to transfer the key bit pattern from the master key to the key blank. Those of ordinary skill in the art will readily be able to employ one of the methods known in the art, or a method and structure described herein to trace, capture, mechanically follow, or otherwise obtain the key bit pattern and either simultaneously or sequentially cause the cutting wheel to cut the master key bit pattern into the key blank blade. In the particular implementation illustrated in FIG. 6, the key blank receiving aperture 70 and the master key receiving aperture 72 includes clamps having clamp surfaces configured with a surface topography that matches the keyway groove patterns of the corresponding two keys for which the key duplication system is customized (Kwikset and Schlage in the embodiment of FIG. 6).

Figure 7A:
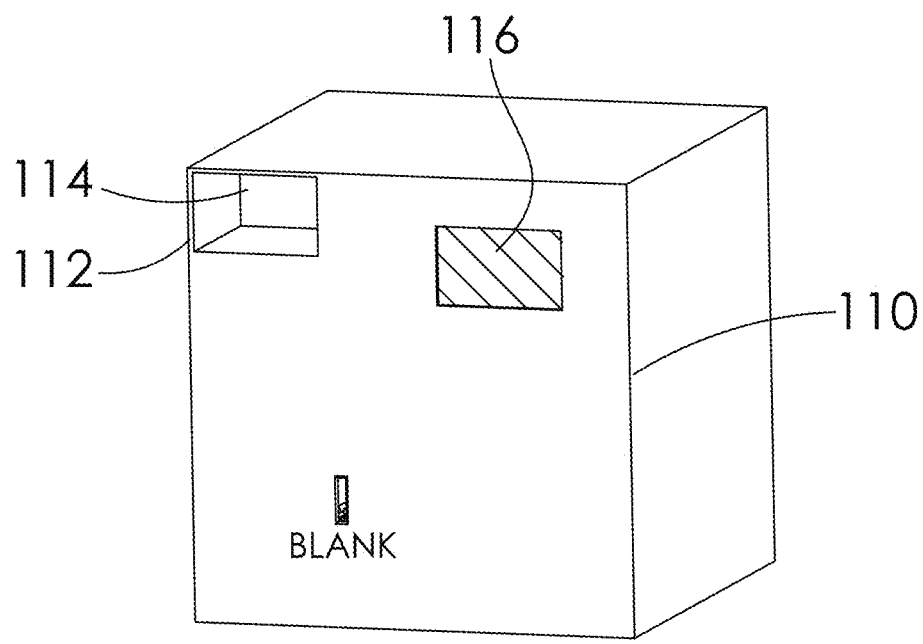
FIG. 7A is a perspective view of a key duplication system comprising a key scanner.
Figure 10:
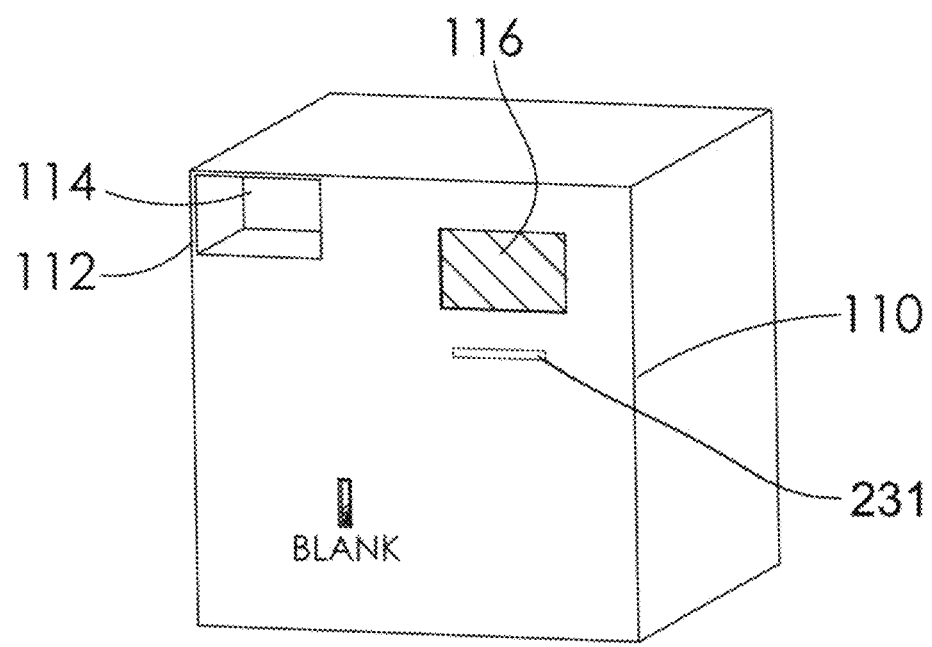
FIG. 10 is a perspective view of a key duplication system with a feedback system.
Figure 11:
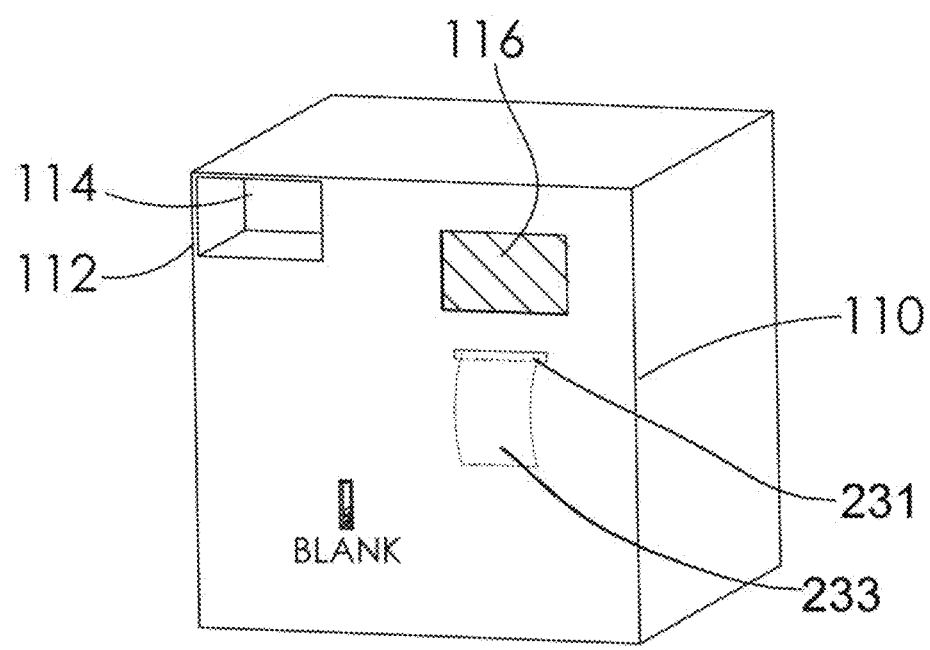
FIG. 11 is the key duplication system of FIG. 10, with a feedback ticket printing from a printer of the feedback system.

In particular implementations of a key duplication system 110, a non-limiting example of which is illustrated in FIG. 7A, at least one master key receiving aperture 112 is coupled with a scanner 114, digital and/or optical, associated with a controller and processor of the key duplication system 110, such that the system digitally identifies the master key. FIGS. 10 and 11 further illustrate a ticket printer 231 and printed ticket 233, described more fully later in this disclosure. In some implementations, if a particular key blank model is not available at a key vending system associated with the key duplication system 110, the system display 116 may communicate instructions to the consumer that they should go to another, remote location, where the key blank model is available for cutting. A instructions on how to get to the other location, along with information identifying the key blank model and even, in some implementations, system and/or operator instructions for selection of an appropriate key blank model and/or key duplication system hardware may be provided on the system display 116, printed from a printer associated with the system display 116, and, in some implementations, transmitted to the other location.

Figure 7B:
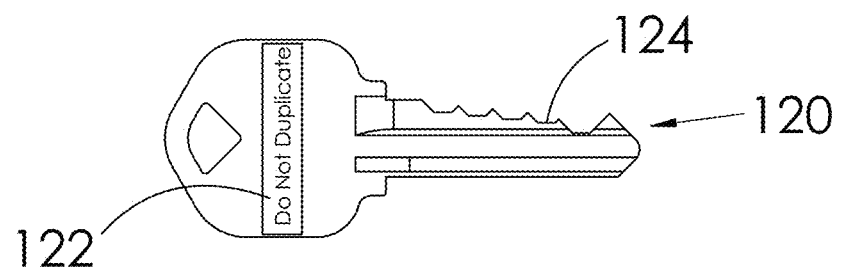
FIG. 7B is a perspective view of a "Do Not Duplicate" key.

Occasionally, a master key 120 includes the words "Do Not Duplicate" 122 (FIG. 7B) engraved or printed on the head of the key to indicate that duplication of the key is restricted. According to a particular method of and system for identifying a master key, the scanner 114 comprises an image capture function, such as through a camera or other image capture device, to determine whether a master key head includes the words "Do Not Duplicate" and stops the duplication process if the words exist on the key head. This process can be accomplished before, during or after the scanner 114 or a related component identifying the master key bit pattern 124 and its type for duplication. This feature may be added to any of the implementations of a key duplication system disclosed or discussed in this disclosure including in those incorporated by reference, by adding a simple camera adjacent to the master key receiving aperture (even adjacent to the master key receiving apertures of the implementations described with reference to FIG. 6) and a processor associated with the system can determine whether the "Do Not Duplicate" message is included on the key head through many different methods of image comparison or even text recognition known in the art. A system display 116 may be included in the system 110 to communicate instructions to the consumer or to direct the consumer to seek assistance if the key includes a "Do Not Duplicate" message.

In particular embodiments of the scanner 114, the digital reader may also be configured to verify whether a duplicate key was cut accurately by the consumer placing the duplicate key in the master key receiving aperture 112 after the key blank is cut into a duplicate key. This may be accomplished by scanning the duplicate key in the same way the master key was scanned, and performing an image comparison to determine whether the duplicate key matches the master key within a predetermined, limited tolerance for error.

Figure 8:
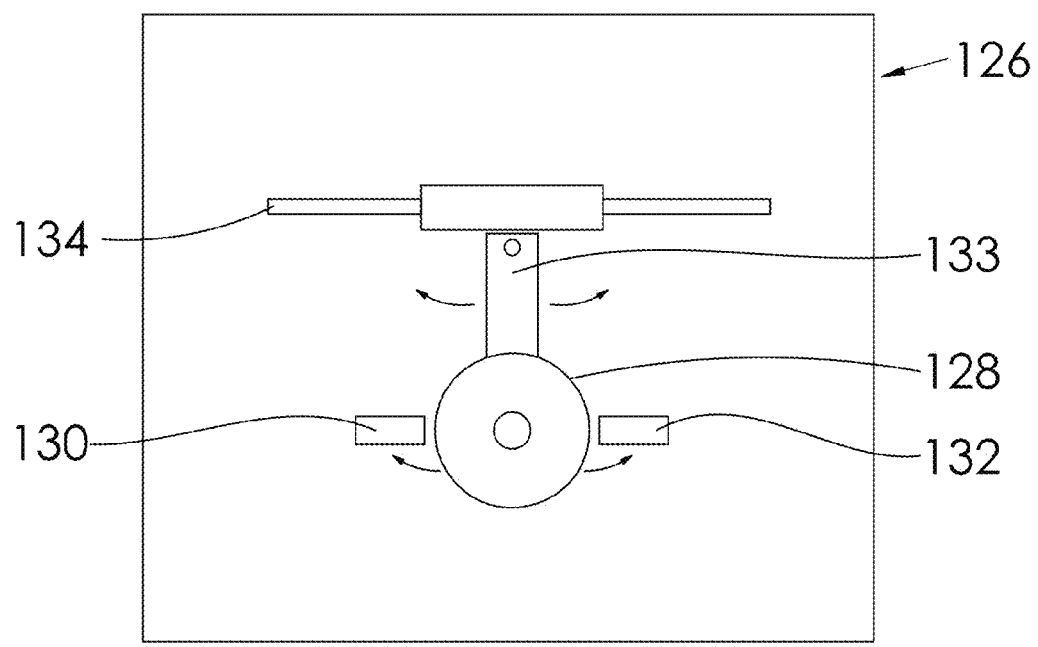
FIG. 8 is a front view of a key duplication system with a front panel removed and only specific parts illustrated for simplicity.

FIG. 8 illustrates a particular implementation the key duplication system 126 wherein the at least one key blank cutter 128 is positioned among the at least two key blank receiving apertures 130, 132. In a first implementation, the at least one cutter may relocate laterally along a support bar 134 in relation to the at least two key blank receiving apertures 130, 132 depending upon which of the at least two key blank receiving apertures has a key positioned therein for cutting. Multiple key blank receiving apertures may be used, for example, to allow each key blank receiving aperture 130 or 132 to be specifically designed for a particular key blank cross-sectional shape. For example, a first key blank receiving aperture may include a clamp specifically configured to hold a Schlage office key and a second key blank receiving aperture may include a clamp specifically configured to hold a Kwikset home key. Once the key blank is placed in a key blank receiving aperture, the system 126, through its motor controls, moves the key blank cutter 128 toward the key blank to be cut and pivots back and forth in that position as it cuts the key. Using the same key blank cutter 128, the system is also configured to move the key blank cutter 128 toward the other key blank receiving aperture to cut a different key from a different manufacturer. In another particular implementation, the at least one cutter 128 does not relocate laterally, but instead simply pivots between the first key blank receiving aperture 130 and the second key blank receiving aperture 132 depending on which one includes a key blank to be cut. The degree of rotation required to permit the same key blank cutter 128 to cut a key blank at two separate rotations along the pivoting path of the key blank cutter is larger than is required to simply cut a key blank at a single location. The specific degree of rotation required depends upon the placement of the particular key blank receiving apertures 130, 132 in relation to the key blank cutter 128, and the length of the support 133. In some particular implementations, two different pivoting components are used, one to pivot the support 133 to move the key blank cutter 128 between and closer to each of key blank receiving apertures 130, 132, and a different pivot, similar to that used in conventional key cutting machines, to pivot the key blank cutter 128 in relation to the key blank, and the support 133, for use after the key blank cutter 128 is in position adjacent a key blank receiving aperture 130, 132 and is cutting a particular key blank in a particular key blank receiving aperture. Once a key blank is received by one of the at least two key receiving aperture, the at least one key blank cutter 128 biases in the direction of the inserted key blank and retracts to its earlier positions once the cutting process is ceased. In particular implementations of the key duplication housing 126, the at least one key blank cutter may furthermore remove added features 136 on a key blank 138.

In places where the description above refers to particular implementations of key duplication system, key receiving aperture, and key blank carrier, it should be readily apparent that a number of modifications may be made without departing from the spirit thereof and that these implementations may be applied to other key duplication system, key receiving aperture, and key blank carrier or in combination.

It will be understood that implementations are not limited to the specific components disclosed herein, as virtually any components consistent with the intended operation of a method and/or system implementation for a key blank or carrier may be utilized. Accordingly, for example, although particular key blanks, carriers, identifiers, feedback modules, and other components may be disclosed, such components may comprise any shape, size, style, type, model, version, class, grade, measurement, concentration, material, weight, quantity, and/or the like consistent with the intended operation of a method and/or system implementation for a key blank or carrier may be used.

The components included in particular implementations of key blanks and carriers may be formed of any of many different types of materials or combinations that can readily be formed into shaped objects and that are consistent with the intended operation of a key blank or carrier. For example, the components may be formed of: rubbers (synthetic and/or natural) and/or other like materials; polymers and/or other like materials; plastics, and/or other like materials; composites and/or other like materials; metals and/or other like materials; alloys and/or other like materials; and/or any combination of the foregoing.

Furthermore, the various components forming a particular implementation of a key blank or carrier may be manufactured separately and then assembled together, or any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled or removably coupled with one another in any manner, such as with adhesive, a weld, a fastener, any combination thereof, and/or the like for example, depending on, among other considerations, the particular material(s) forming the components.

Particular implementations of the key cutting machine with a standard reference features may include a key blank cutter to cut a key blank carried within a key blank carrier or not within a key blank carrier, a key blank receiving aperture and a key blank carrier clamp to align a key blank or key blank carrier by holding at least a portion of the key or the blank carrier within the key cutting machine housing in a predetermined position with respect to the key blank cutter. The standard reference features of the key receiving aperture may allow certain key blank brands or key blanks contained in a key blank carrier to interface with the machine and may align key blanks or key blanks contained in a carrier within a key cutting machine with respect to a key blank cutter. An implementation of the key blank receiving aperture may receive different key brands or contained in a key blank carrier. An implementation of the key blank clamp secures a portion of a key blank or key blank carrier by interfacing with the surface of the key blank or the key blank carrier to prevent a key blank from moving while being cut within the key duplication housing.

Figure 9:
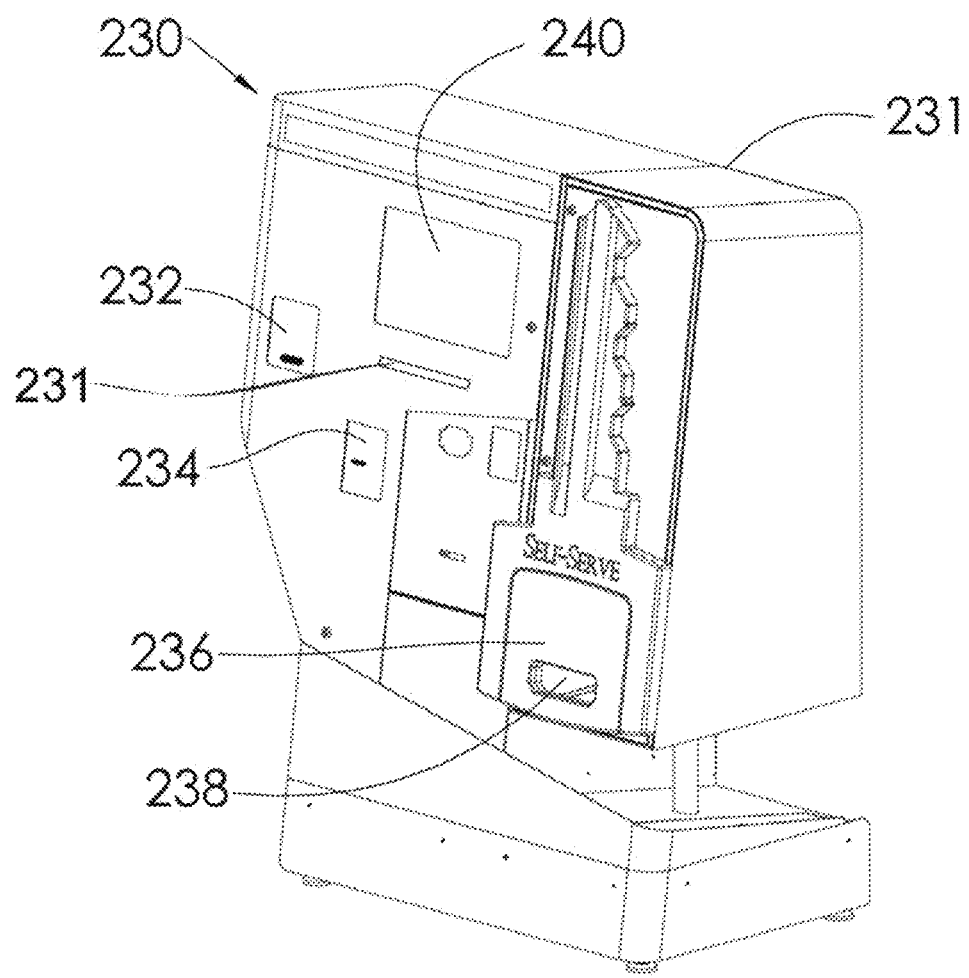
FIG. 9 is a perspective view of a key duplication system and related key vending system with a feedback system.

FIG. 9 illustrates a particular implementation of a key duplication system 230 wherein a key duplication machine housing 231 includes a key identification system 232, a key cutting system 234, and a key blank vending system 236 operatively coupled together and associated with one or more computer processors running software operative to provide the functions needed to initiate the steps required for key duplication and customer interaction, as well as reporting functions and data transfer between the different systems as needed. In some embodiments, key identification is accomplished with the assistance of a laser that uses optical sensors to capture data indicating structural features of the key. In other embodiments, a camera is used, which captures an image of the key. In yet other implementations, pressure, heat or other sensors, including mechanical sensors, are used to capture the data indicating the physical characteristics. Any other contact or non-contact sensor or other key identification method or structure known in the art may be used in combination with this system. In some implementations, duplicated keys or key blanks are vended from within the housing 231 through a key return 238. In some implementations, the keys are cut prior to being vended. In a particular implementation, a mechanical arm or other automation within the key blank duplication machine housing 231 automatically moves key blanks from a vending system storage to a cutting position and a key cutter cuts a key blank with the identified key pattern from a corresponding master key. A particular system display is shown as interface 240.

In some embodiments of this particular implementation or any other embodiment or implementation disclosed herein, the system may comprise a master key identification feedback system. A key duplication system may only be capable of duplicating particular models of keys (e.g. single-sided keys or house keys), or a key vending system associated with the key duplication system may house only certain models of keys. In some vending implementations, such a system is configured to identify an appropriate key blank based on the data indicating the physical characteristics of the master key identified in the master key identification system, search the available key blanks in the associated vending system, allow the user to choose from the available key blanks, and either automatically dispense the key blank to be cut or automatically transfer the key blank to the cutting system for cutting prior to dispensing.

In some implementations, it is inconvenient to supply every possible model of key blank at the duplication system. For example, often an overwhelming portion of commonly duplicated keys corresponds to only a few key models. In many such cases, it is desirable to only supply key blanks for the most commonly duplicated key models, which means that some key blank models would not be available to the user at the key duplication system. In some implementations, at least some unavailable key blank models are available at a nearby location. For example, if the system is implemented in a retail store, the retail store may have an alternate location, often within the store, where the key cutting can be done manually or in some other conventional way. Such a location may be supplied with a wider variety of key blank models. Therefore, in some implementations, the system may be configured to direct the user to such alternate location, and in particular locations an alternate location within the same retail store, when the desired key blank model is not available at the key duplication machine and when it is available at the alternate location.

In some implementations, a feedback module is coupled to the key identification housing. The feedback module is configured to receive data from a processor that is in communication with the master key identifier. In some embodiments, the feedback module includes a piece of hardware such as a printer 231, as shown in FIGS. 9-11. Any printer known in the art is suitable for use with this system, though a conventional retail cash register receipt printer is particularly suited to this application due to its inexpensive cost, small size and familiarity to retail workers. However, a person of ordinary skill in the art will appreciate that other feedback module components may be used. For example, a visual display monitor 240 or a wired or wireless communication device may be used in some implementations. Whether the feedback data is provided through a printed ticket, a visual display, a wired or wireless communication device or some combination of two or more of these, the feedback system can be configured to provide feedback data to the user to direct the user to another location where the needed key blank can be cut and may even provide instructions to the other location's key cutting associate or key cutting system as to which key blank is needed or even where the other location's key identification system can find a file containing the master key identification data.

By way of specific example, a person may use the master key identifier to identify the master key. The master key identifier sends identification data to the processor (e.g. data representing physical characteristics, such as dimensions, patterns, or other parameters indicative of a particular key model either received from the master key identifier or from data input by the operator or a combination of both). The processor may access a database defining what key models are known and determines whether the received identification data corresponds to a known key model, thus attempting to identify the model of the master key. If the master key model can be identified, the processor accesses a database defining which known key models are available at a key blank dispensing/vending machine either coupled to or situated near the key duplication system.

In particular embodiments with a feedback device, when the processor determines that the model of the master key is not available at the key blank dispensing/vending machine associated with the key identification system or that the key blank cutting system associated with the key identification system is unable to cut the master key identified, it communicates with the feedback device to provide information to the user as to where the user can go to have a duplicate key cut for that particular master key.

By specific example, the processor may communicate data that causes the feedback device to display on a visual display 240 and/or a printed display 231 provided to the user, a "ticket" with directions to a location remote from the key identification housing where a key blank having the same model of the particular master key is available for duplicating the master key.

Figure 12:
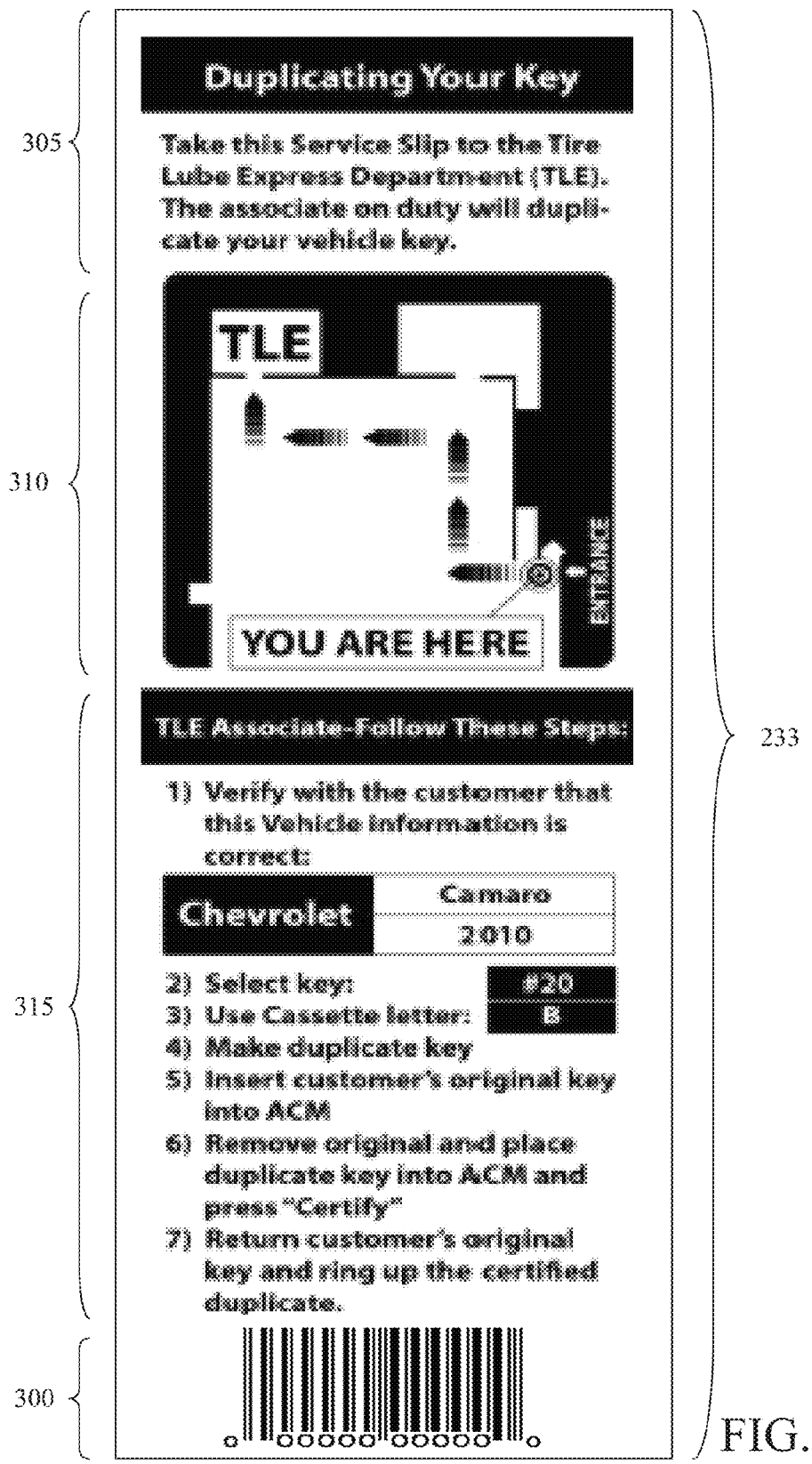
FIG. 12 is an example of a feedback ticket.

A non-limiting example of a "ticket" and the type of information that may be provided on the ticket 233 (FIG. 11) is provided in FIG. 12. It is anticipated that in addition to displaying at least a portion of this information on the visual display 240, the customer will receive a printed ticket with the information to assist in reaching the remote location and to provide the remote location with information regarding which key blank is needed and/or which master key is being duplicated.

In the non-limiting example of FIG. 12, the feedback module displays on the ticket 233 the indication of the model of the master key, together with directions to a location remote from the key identification model where an appropriate key blank is available. An indication of the model of the master key may include, for example, a manufacturer name, a model name, a SKU, a graphic representation of the master key, a barcode 300, and/or a unique identification number. Directions may include, for example, a map 310, text 305, or other indicators that instruct a user where to go in order to obtain a key blank of the appropriate model. A ticket 233 may also provide sales associate instructions 1220. These instructions may be as simple as merely an indication of which key blank is needed, or more complex instructions as to how to operate the key duplication system at the remote location. In implementations where the ticket is printed for the customer, the customer may take and deliver the ticket 233 to a sales associate at the remote location. Because of the information on the ticket, the sales associate can quickly ascertain which key blank model is needed. The salesperson selects the appropriate model key blank from stock, takes the user's master key, and provides a duplicate key in a conventional manner.

According to particular embodiments, a printed ticket 233 generated by the feedback module 231 at least identifies the master key, by data such as which classification of key the key falls into (home, office, auto, small lock, etc.), the manufacturer of the key, the duplicate key blank code (i.e. KW5, KW10, KW11, SC4, SC6, SC7, etc. for the various manufacturers and keys), and/or the equipment through which the duplicate key would be manufactured. In the particular example provided in FIG. 12, the duplication system at the remote location is an Axxess key duplication machine, and so instructions as to which Axxess key duplication machine's cassette corresponds to the key blank needed is also provided on the ticket. The information is printed on the referral ticket and dispensed to the consumer at the master key identification system with instructions on where the consumer should take the referral ticket to get the key duplicated. The consumer can then take the ticket to the counter, part of the store or other location or store indicated on the referral ticket, submit the referral ticket to a sales associate at the duplication location and have the key duplicated.

In some implementations, the ticket may comprise simply a bar code or reference number that identifies a database reference through which a worker can retrieve some or all of the ticket data at that or a later time. Some of the data associated with the ticket may include the master key data so that the master key and its key bit pattern would not need to be re-identified. This may be in addition to or in lieu of other master key identification data.

By more specific example, a consumer may take the consumer's auto key to the self-service kiosk master key identification system near a front end of a retail store and place it on a glass plate within the system. The key identification system either asks the consumer questions to assist in identification of the key or simply identifies the master key. The consumer is informed by the user interface that the master key is an auto key and possibly that the key is for a 2010 Camaro. For this example, it is assumed that the key cutting machine associated with the particular master key identification system is not configured to cut auto key blanks. The processor, referencing a master key identification database, identifies which key blank corresponds to that master key, identifies which Axxess key cutting cassette is needed to cut a duplicate for that master key, and that the duplicate key needs a transponder chip. The display associated with the identification system indicates to the consumer that the self-serve kiosk cannot create a duplicate key for that particular key but that if the consumer takes the key and the referral ticket to the automotive department service desk, a store employee will gladly create the duplicate key for the consumer. The identification system then prints the referral ticket for the consumer with relevant master key identification information to inform the store employee of what is needed to create the duplicate key. When the store employee receives the referral ticket, the store employee briefly, visually confirms that the key appears to be what the system identified it as (Lexus Auto key), pulls an appropriate key blank as identified on the referral ticket, and pulls the Axxess key cutting system cassette identified on the referral ticket to create the duplicate key.

In some embodiments, the referral is forwarded electronically, either automatically or upon consumer option, to a separate terminal (such as by wired or wireless transmission, through intranet or Internet). A worker can receive the referral information at the separate terminal similar to the information included on the referral ticket, and create an appropriate duplicate key as with the referral ticket example. Alternatively, ticket data may be forwarded directly to a remote key cutting machine for cutting of the duplicate key by a remote duplication machine operator.

In a third implementation, the consumer is provided with key duplication options for selecting or creating a custom duplicate key blank that is not immediately available at the store. In such cases, the consumer may place their master key in the master key identification system and have it identified, select on the user display that the consumer wants to create a custom key, and receive the referral ticket with the identification data included on the ticket or in association with a reference number on the ticket. Alternatively, or additionally, the consumer may request the data to be electronically transmitted, such as by email or text message, to the consumer or a location of the consumer's choice, or stored in association with a login account of the consumer associated with the key identification system. The consumer, either at the user interface or later through a web site accessed from another location such as the consumer's home, may later custom design a duplicate key from the options at the web site and request that the custom key be mailed to the consumer or to a store of the consumer's choosing. The custom key may be mailed as a key blank that the consumer takes to the store to be cut, or may, in particular implementations, be a fully cut key, cut according to the bit code identified from the master key. If a key blank is mailed, the consumer can take it back to the store and, using the previously printed referral ticket or with reference to a referral number or code, put or have a worker put the custom key blank into a key cutting machine and cut the custom key blank. In alternate embodiments, the consumer who knows their key type may begin at the web site and request and, in some cases, pay for the custom key blank with an activation code that is provided to the store when the consumer takes the key blank to be cut. In other embodiments, the pre-paid or partially pre-paid custom key may be forwarded directly to the store where the consumer can pick up the key and purchase the cutting of the key at the store.

The implementations listed in this disclosure, and many others, will become readily apparent from this disclosure. From this disclosure, those of ordinary skill in the art will readily understand the versatility with which this disclosure may be applied. In particular, it will be understood by those of ordinary skill in the art that the ticket implementations may be embodied in combination with a key duplication system, or as a separate key identification unit which merely identifies the key and directs the user to a location for obtaining a duplicate key.

In places where the description above refers to particular implementations of key duplication system, it should be readily apparent that a number of modifications may be made without departing from the spirit thereof and that these implementations may be applied to other key duplication system or system portion. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. A master key model identification and feedback system comprising:
   a key identification housing comprising a master key identifier coupled to the housing and comprising a user interface configured to one or more of capture physical characteristics of the master key and receive input through the user interface regarding identification of the master key;
   a processor, in communication with the master key identifier, the processor configured to access a database defining a plurality of known key models, one or more of compare the physical characteristics of the master key with physical characteristics of the known key models in the database and/or compare the input received from the user with the known key models in the database to identify a model of the master key, and communicate the model of the master key to a feedback module coupled to the key identification housing;
   wherein the processor is configured to determine whether the model of the master key matches a model of at least one of a plurality of available key blanks; and
   the processor communicates the model of the master key and directions to a location remote from the key identification housing where a key blank having the same model of the master key is available for duplicating the master key to the feedback module when the model of the master key is not among one of the plurality of available keys; and
   a key duplication system operatively associated with the key identification housing and housing the plurality of available key blanks of the plurality of known key models, and configured to dispense an available key blank when a user selects one of the available key blanks.

2. The master key model identification and feedback system of claim 1, wherein the feedback module comprises a printer configured to print the model of the master key on a ticket.

3. The master key model identification and feedback system of claim 2, wherein the printer is further configured to print the directions to the remote location on the ticket.

4. The master key model identification and feedback system of claim 1, wherein the master key identifier comprises a scanner that captures the physical characteristics of the master key.

5. The master key model identification and feedback system of claim 1, wherein the indication of the model of the master key comprises one or more of: a manufacturer name, a model name, a SKU, a graphic representation of the master key, a barcode, and a unique identification number.

6. The master key model identification and feedback system of claim 1, wherein if the processor is unable to identify the model of the master key from the physical characteristics of the master key, the feedback module outputs an indication that the model of the master key is unknown and directions to the location remote from the key identification housing where additional identification assistance is available to identify the model of the master key.

7. The master key model identification and feedback system of claim 1, further comprising a master key receiving aperture on the housing sized to receive the master key.

8. The master key model identification and feedback system of claim 1, wherein the feedback module outputs at least one of the indication and the directions through at least one of a visual display coupled to the key identification housing, a printed display, a printer, a wireless communication device, a wired communication device, email and text message.

9. The master key model identification and feedback system of claim 1, wherein the directions comprise at least one of a map and text.

10. The master key model identification and feedback system of claim 1, wherein the directions comprise at least one of instructions to a consumer for where to go in order to obtain the key blank, and instructions for how to obtain the key blank.

11. The master key model identification and feedback system of claim 1, wherein the feedback module outputs the indication of the model of the master key to at least one of the location remote from the key identification housing, electronically to a separate terminal, and to electronic storage in association with an account of a consumer associated with the master key.

12. The master key model identification and feedback system of claim 1, wherein the feedback module further outputs instructions for a sales associate regarding at least one of the key blank and the master key.

13. The master key model identification and feedback system of claim 1, wherein the feedback module further outputs an indication of which equipment to use for cutting the key blank.

14. A method for verifying a master key model and providing feedback to a customer, the method comprising:
   one or more of receiving input from a user to identify a model of a master key, and capturing physical characteristics of the master key with a master key identifier;
   accessing, with a processor, a database defining a plurality of known key models;
   comparing, with the processor, one or more of the input from the user with the known key models in the database and the physical characteristics of the master key with physical characteristics of the known key models in the database, to identify the model of the master key;
   communicating, with the processor, the model of the master key to a feedback module coupled to the key identification housing;
   providing a key duplication system operatively associated with the key identification housing and housing a plurality of available key blanks of known key models;
   dispensing, with the key duplication system, a selected available key blank matching the model of the master key when a user selects the selected available key blank;
   communicating, with the processor, the model of the master key to the feedback module when the model of the master key is not among the plurality of available key blanks; and
   responding to the communication from the processor, with the feedback module, by outputting an indication of the model of the master key and directions to a location remote from the key identification housing where a key blank having the same model as the master key is available for duplicating the master key when the model of the master key is not among the plurality of available key blanks.

15. The method of claim 14, wherein outputting an indication and directions comprises printing, with the feedback module, the indication of the model of the master key on a ticket.

16. The method of claim 15, wherein outputting an indication and directions further comprises printing the directions to the remote location on the ticket.

17. The method of claim 14, wherein the master key identifier comprises a scanner that captures the physical characteristics of the master key.

18. The method of claim 14, wherein the indication of the model of the master key comprises one or more of: a manufacturer name, a model name, a SKU, a graphic representation of the master key, a barcode, and a unique identification number.

19. The method of claim 14, further comprising, if the processor is unable to identify the model of the master key from the physical characteristics of the master key, outputting, with the feedback module, an indication that the model of the master key is unknown and directions to the location remote from the key identification housing where additional identification assistance is available to identify the model of the master key.

20. The method of claim 14, wherein outputting at least one of the indication and the directions comprises outputting through at least one of a visual display coupled to the key identification housing, a printed display, a printer, a wireless communication device, a text message, an email, and a wired communication device.

21. The method of claim 14, wherein the directions comprise at least one of a map and text.

22. The method of claim 14, wherein the directions comprise at least one of instructions to a consumer for where to go in order to obtain the key blank, and instructions for how to obtain the key blank.

23. The method of claim 14, wherein outputting the indication comprises outputting to at least one of the location remote from the key identification housing, electronically to a separate terminal, and to electronic storage in association with an account of a consumer associated with the master key.

24. The method of claim 14, further comprising outputting at least one of instructions for a sales associate regarding at least one of the key blank and the master key, and an indication of which equipment to use for cutting the key blank.

25. A master key model identification, duplication, and feedback system comprising:
a key identification housing comprising a master key identifier coupled to the housing and comprising a user interface configured to one or more of receive input through the user interface about the master key and capture physical characteristics of the master key;
a key duplication system operatively associated with the key identification housing, housing a plurality of available key blanks of known key models, and configured to dispense an available key blank when a user selects the available key blank;
a processor, in communication with the master key identifier, the processor configured to:
access a database defining the plurality of known key models; and
one or more of: compare the physical characteristics of the master key with physical characteristics of the known key models in the database to identify a model of the master key; and compare the input received from the user with the known key models in the database to identify a model of the master key;
determine whether the model of the master key matches a model of at least one of the plurality of available key blanks; and
communicate the model of the master key to a feedback module, comprising a printer and coupled to the key identification housing, when the model of the master key does not match a model of at least one of the plurality of available key blanks;
wherein the feedback module, responsive to the communication from the processor, prints on a ticket an indication of the model of the master key and directions to a location remote from the key identification housing where a key blank having the same model of the master key is available for duplicating the master key.

26. The master key model identification, duplication, and feedback system of claim 25, wherein the indication of the model of the master key comprises one or more of: a manufacturer name, a model name, a SKU, a graphic representation of the master key, a barcode, and a unique identification number.

27. The master key model identification, duplication, and feedback system of claim 25, wherein the master key identifier comprises a scanner that captures the physical characteristics of the master key.

28. The master key model identification, duplication, and feedback system of claim 25, wherein if the processor is unable to identify the model of the master key from the physical characteristics of the master key, the feedback module prints on a ticket an indication that the model of the master key is unknown and directions to the location remote from the key identification housing where additional identification assistance is available to identify the model of the master key.

29. The master key model identification, duplication, and feedback system of claim 25, further comprising a master key receiving aperture on the housing sized to receive the master key.

30. A master key identification and feedback system comprising:
a master key identifier comprising a user interface configured to one or more of capture physical characteristics of a master key and receive input through the user interface regarding identification of the master key;
and a processor, in communication with the master key identifier, the processor configured to access a database defining a plurality of known key models, one or more of compare the physical characteristics of the master key with physical characteristics of the known key models in the database and compare the input received from the user with the known key models in the database to identify a model of the master key, and provide an indication of the model of the master key to a consumer feedback module in communication with the master key identifier;
wherein the feedback module, responsive to the communication from the processor, provides an indication of the model of the master key, and directions to a location remote from the master key identification and feedback system where a key blank of the same model as the master key is available for creating a duplicate key; and
a key duplication system operatively associated with the master key identifier, wherein the key duplication system further comprises a key vending system configured to dispense a selected available key blank matching the model of the master key when a user selects an available key blank.

31. The master key identification and feedback system of claim 30, wherein the feedback module comprises a printer configured to print the model of the master key on a ticket.

32. The master key identification and feedback system of claim 31, wherein the printer is further configured to print the directions to the remote location on the ticket.

33. The master key identification and feedback system of claim 30, wherein the master key identifier comprises a scanner that captures the physical characteristics of the master key.

34. The master key identification and feedback system of claim 30, wherein the indication of the model of the master key comprises one or more of: a manufacturer name, a model name, a SKU, a graphic representation of the master key, a barcode, and a unique identification number.

35. The master key identification and feedback system of claim 30, wherein the feedback module outputs at least one of the indication and the directions through at least one of a visual display coupled to the key identification housing, a printed display, a printer, a wireless communication device, a wired communication device, email and text message.

36. The master key identification and feedback system of claim 30, wherein the directions comprise at least one of a map and text.

37. The master key identification and feedback system of claim 30, wherein the directions comprise at least one of instructions to a consumer for where to go in order to obtain the key blank, and instructions for how to obtain the key blank.

38. The master key identification and feedback system of claim 30, wherein the feedback module outputs the indication of the model of the master key to at least one of the location remote from the key identification housing, electronically to a separate terminal, and to electronic storage in association with an account of a consumer associated with the master key.

39. The master key identification and feedback system of claim 30, wherein the feedback module further outputs instructions for a sales associate regarding at least one of the key blank and the master key.

40. The master key identification and feedback system of claim 30, wherein the feedback module further outputs an indication of which equipment to use for cutting the key blank.

41. A master key identification and feedback system comprising:
    a key identification housing comprising a master key identifier having a user interface configured to receive user input for master key identification;
    a processor, in communication with the master key identifier, the processor configured to identify a master key based on the user input;
    wherein the processor is configured to determine whether the identified master key matches at least one of a plurality of available key blanks; and
    the processor communicates the identification of the master key to a feedback module when the identified master key is not among one of the plurality of available key blanks, the feedback module outputting the identification of the master key through a visual display and communicating that a matching key blank is available at a location remote from the key identification housing;
    wherein the feedback module is configured to electronically communicate the identification of the master key via a text message; and
    a key blank cutter configured to cut one of the plurality of key blanks when the identified master key matches at least one of the plurality of available key blanks.

42. The master key model identification and feedback system of claim 41, wherein the output includes an indication of the equipment to cut the key blank at the remote location.

43. The master key model identification and feedback system of claim 41, wherein the feedback module is configured to electronically communicate the identification of the master key via an email.

44. A master key identification and feedback system comprising:
    a key identification housing comprising a master key identifier having a user interface configured to receive user input for master key identification;
    a processor, in communication with the master key identifier, the processor configured to identify a master key based on the user input;
    wherein the processor is configured to determine whether the identified master key matches at least one of a plurality of available key blanks; and
    the processor communicates the identification of the master key to a feedback module when the identified master key is not among one of the plurality of available key blanks, the feedback module outputting the identification of the master key through a visual display and communicating that the master key can be duplicated at another location in a store;
    wherein the feedback module is configured to electronically communicate the identification of the master key via a text message; and
    a key blank cutter configured to cut one of the plurality of key blanks when the identified master key matches at least one of the plurality of available key blanks.

45. A master key identification and feedback system comprising:
    a key identification housing comprising a master key identifier having a user interface configured to receive user input for master key identification;
    a processor, in communication with the master key identifier, the processor configured to identify a master key based on the user input;
    wherein the processor is configured to determine whether the identified master key matches at least one of a plurality of available key blanks; and
    the processor communicates the identification of the master key to a feedback module when the identified master key is not among one of the plurality of available key blanks, the feedback module outputting the identification of the master key through a visual display;
    wherein the feedback module is configured to electronically communicate the identification of the master key via a text message; and
    a key blank cutter configured to cut one of the plurality of key blanks when the identified master key matches at least one of the plurality of available key blanks.

* * * * *